Oct. 1, 1940.  A. HUET  2,216,111
COMBINED RADIATOR AND AIR DEFLECTOR
Filed Aug. 30, 1938
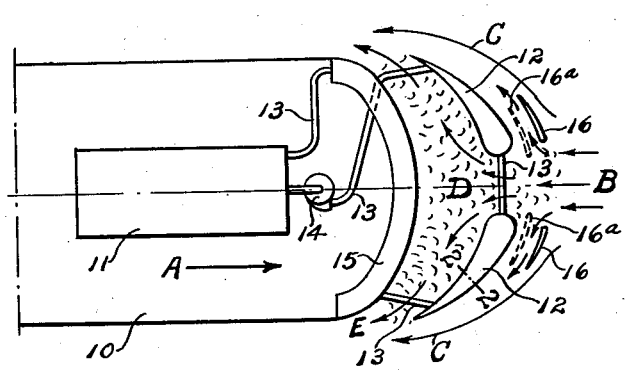
Fig.1
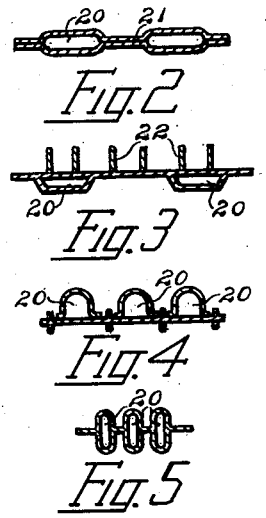
Fig.2
Fig.3
Fig.4
Fig.5
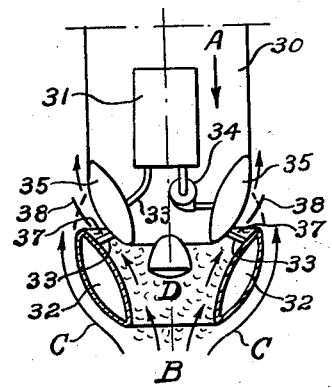
Fig.6
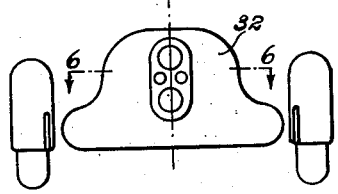
Fig.7
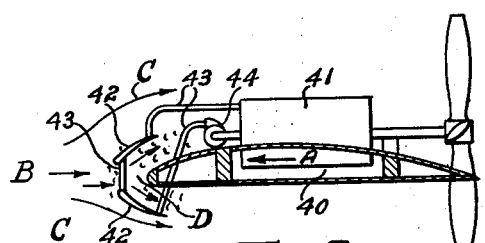
Fig.8
INVENTOR
ANDRE HUET
BY O. V. Thiel
ATTORNEY Patented Oct. 1, 1940

2,216,111

UNITED STATES PATENT OFFICE 2,216,111

COMBINED RADIATOR AND AIR DEFLECTOR

André Huet, Paris, France

Application August 30, 1938, Serial No. 227,449
In France August 31, 1937

3 Claims. (Cl. 123—174)

The present invention has for its object improvements in aerodynamic stream lining of moving bodies. The improvements consist principally in providing air deflectors which serve for aerodynamic stream lining of the moving body and utilizing these deflectors also as heat exchanging surfaces to replace or act in conjunction with radiators or condensers that are normally provided on moving bodies such as automobiles, airplanes or railway motor cars. These heat exchanging surfaces are preferably of a form having the least resistance to movement, or an approximation thereto.

The deflecting surfaces are preferably formed of air foils, plain or channeled, and built to contain the fluid to be cooled. These air foils are disposed in principle following the lines of flow of the air or approximating these lines, always to obtain the greatest efficiency of cooling from these surfaces.

Moreover these surfaces can be disposed in superposed relation or staggered, or superposed and staggered, leaving between them canals for the passage of the air. The said canals form a sort of diffuser which contributes to assure the aerodynamic stream lining of the moving body.

More precisely, the deflectors can be arranged in the manner described for the deflecting surfaces in applicant's earlier application, Serial No. 86,714, filed June 23, 1936, now Patent No. 2,177,887, issued October 31, 1939, and Patent No. 2,122,422, issued July 5, 1938, particularly the latter which involves deflecting surfaces disposed so as to form at the front or other point of the moving body a protective aerial body at high static pressure.

The deflector-radiators arranged thus can be utilized alone or in combination with other deflecting surfaces mounted in front of the moving body and which can be of the type described in the above mentioned application and patent, these surfaces assuring in general the deflection and the transformation of the energy contained in the air to obtain an aerodynamic stream lining of the vehicle.

These deflecting surfaces can moreover be movable as is disclosed in my co-pending United States application, Serial No. 161,012, filed August 26, 1937, so as to take variable orientation and to provide, if necessary, an increase in the resistance to the forward movement of the body (instead of decreasing it) and consequently act to brake the movement of the body.

The invention contemplates an advantageous application of these earlier arrangements to motor driven rail cars which can be operated in both directions without being turned. To this end deflector-radiators are arranged at the two extremities of the vehicle and these surfaces are provided with small deflectors which, at the forward end, may serve either to decrease the resistance or provide a braking action and at the same time function to vary the flow of cooling air. Moreover, at the rear of the vehicle the secondary deflectors can cause the air to strike more abruptly on the cooling surfaces constituted by the deflector-radiators at the rear to increase the efficiency of cooling while at the same time reducing the vacuum or eddy currents which normally tend to form at the rear of the vehicle.

The following description when considered in conjunction with the appended drawing shows by way of example several arrangements for carrying out the invention:

Figure 1 is a fragmentary diagrammatic plan view of a vehicle provided with apparatus embodying the invention.

Figures 2, 3, 4 and 5 are sectional views on line 2—2, Fig. 1, indicating several methods of forming the cooling surfaces embodying the invention.

Figures 6 and 7 are plan and front elevational views of an automobile embodying the invention according to another embodiment, and Figure 8 illustrates the invention as applied to an airplane.

In Figure 1, the forward end of a moving body is shown in fragmentary form and designated by the numeral 10, it being assumed that the body is being driven by the motor 11 in the direction indicated by the arrow A. At a point forwardly of the front end of the body 10 a pair of substantially vertically extending deflectors 12 are mounted in laterally spaced relation and inclined outwardly and rearwardly with respect to the longitudinal axis of the body. Wind currents B encountered by the body 10 in its movement are deflected laterally as indicated by the arrows C out of the path of movement of the body so as to decrease the resistance opposed by the wind to its forward movement. Part of the air currents pass between the deflectors 12 and in traversing the rearwardly diverging passage resulting from their rearward and outward inclination the velocity of the air currents is reduced with resulting increase in static pressure. Consequently, a body of air D is formed forwardly of the front end of the vehicle which is at a higher static pressure than the wind currents and acts to prevent their entering the space between the rear sides of the deflectors 12 and the front end of the vehicle. This type of deflecting device and its operation is more fully described in Patent No. 2,122,422, issued to me July 5, 1938.

The deflectors 12 are hollow so that fluid for cooling the motor 11 may be circulated through them by means of piping 13 and a pump 14. In the arrangement shown these deflectors are connected in series with the water jacket of motor 11 and a conventional radiator 15 mounted at the front of the vehicle 10. The radiator 15 is mounted so as to form part of the outer wall surface of the vehicle at its front end. It may be positioned in any desired location such as along the roof or near the floor of the vehicle. However, if desired, only the deflectors 12 may be employed for cooling the fluid circulated through the jacket of the engine 11.

Secondary deflecting surfaces 16, arranged in a manner similar to that of deflectors 12, are mounted forwardly of the latter to complete the aerodynamic action of these deflecting surfaces. The deflecting surfaces 16 may be movable so as to assume the positions indicated in dotted lines at 16a. In this latter position the air which would normally be deflected by the secondary deflectors 16 strikes more forceably against the main deflectors 12 to assure a more efficient cooling of the fluid circulating therethrough.

The deflector-radiator surfaces 12 may have different forms, as represented in Figures 2 to 5. In Figure 2 the surface 12 is made up of channels 20 connected by webs 21. In Figure 3 channels 20 are also formed and provided with cooling ribs or fins 22 extending in the direction of air flow. In Figures 4 and 5 the channels 20 are formed so as to not only function as fluid passages but provide extended cooling surfaces or ribs disposed in the direction of air flow.

Figures 6 and 7 illustrate the application of the invention to an automobile 30 moved in the direction A by its motor 31. In this arrangement the deflecting surfaces 32 mounted forwardly of the front end of the automobile as well as the radiator 35 are of hollow and annular form so that cooling fluid for the motor 11 may be circulated through them by means of a pump 34 and piping 33. This arrangement also provides channels 37 between the rear sides of the deflectors 32 and the opposed surfaces of the radiator 35. The rear ends of these channels may be provided with shutters or louvres 38 for regulating the flow of air through these channels and hence controlling the cooling action.

In Figure 8 illustrating the application of the invention to an airplane the forward or leading edge of the wing 40 is protected by the deflectors 42 which also function as radiators due to their being connected by piping 43 to the pump 44 of the motor cooling system. This arrangement has the further advantage of preventing formation of ice on the leading edge of the wing in cold weather. Since, in addition, to the most advanced surfaces being formed by the deflectors 42 through which the hot fluid is circulated, the body of air D which provides aerodynamic protection for the leading edge is also warmed and protects against the formation of ice on the leading edge of the wing.

Although illustrative embodiments of the invention have been shown in the drawing and described in detail herein it is to be understood that there are many changes and variations that may be made without departing from the spirit of the invention. Therefore, it is to be understood that all such changes and variations are intended to be included within the scope of the appended claims.

What I claim is:

1. In combination with a moving body having a motor arranged to be cooled by circulation of a cooling fluid; hollow, air deflecting means positioned forwardly of the front end of said body so arranged as to divert air currents encountered in or created by its movement outwardly away from said front end for reducing the resistance imposed by air to the movement of said body; and connections between said motor and said deflecting means for circulating through the latter the fluid employed to cool said motor.

2. In combination with a moving body having a fluid cooled motor or engine for driving it and a radiator or the like through which the motor cooling fluid is circulated; hollow air deflecting members positioned forwardly of the front end of said body for diverting air currents created or encountered in the movement outwardly away from said front end so as to reduce the resistance imposed by said air currents to the movement of said body; and connections between said radiator and deflectors for circulating the motor cooling fluid through the latter.

3. Apparatus for reducing resistance opposed by wind currents to the forward movement of a vehicle having a closed front end comprising; deflecting members mounted in transversely spaced relation centrally and forwardly of said closed front end of said vehicle and having surfaces inclined outwardly and rearwardly with respect to its longitudinal axis for deflecting wind currents outwardly away from the path of movement of said vehicle, the spacing of said deflecting members providing an unobstructed orifice opposite the closed front end of said vehicle and the adjacent inner portions of said deflecting members being so shaped that said orifice forms a rearwardly diverging passage for creating in the space behind said deflectors and between the latter and the front of the vehicle a body of air of higher static pressure than exists in the deflected wind currents for maintaining them away from the front of the vehicle, said deflecting means being of hollow construction; a fluid cooled engine driving said vehicle; and means for circulating the motor cooling fluid through said deflecting members to transfer to the air the heat absorbed by the cooling fluid from the motor.

ANDRÉ HUET.